US012784152B2

(12) United States Patent
K S et al.

(10) Patent No.: US 12,784,152 B2
(45) Date of Patent: Nov. 3, 2026

(54) METHOD AND SYSTEM FOR IMAGE ARTIFACT MODIFICATION BASED ON USER INTERACTION

(71) Applicant: SAMSUNG ELECTRONICS CO., LTD., Suwon-si (KR)

(72) Inventors: Green Rosh K S, Thrissur (IN); Bindigan Hariprasanna Pawan Prasad, Bengaluru (IN); Alok Shankarlal Shukla, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 392 days.

(21) Appl. No.: 18/230,451

(22) Filed: Aug. 4, 2023

(65) Prior Publication Data

US 2023/0377098 A1 Nov. 23, 2023

Related U.S. Application Data

(63) Continuation of application No. PCT/KR2023/006826, filed on May 19, 2023.

(30) Foreign Application Priority Data

May 20, 2022 (IN) ............................ 202241029283
Apr. 6, 2023 (IN) ............................ 202241029283

(51) Int. Cl.
*G06T 5/70* (2024.01)

(52) U.S. Cl.
CPC ...... *G06T 5/70* (2024.01); *G06T 2207/10016* (2013.01); *G06T 2207/20084* (2013.01); *G06T 2207/20104* (2013.01)

(58) Field of Classification Search
CPC ............ G06T 5/70; G06T 2207/10016; G06T 2207/20084; G06T 2207/20104; G06T 5/60; G06T 5/73; G06T 2207/20081; G06N 3/0464; G06N 3/10; G06N 3/045; G06F 3/04842; G06F 3/04845; G06F 3/04847;

(Continued)

(56) References Cited

U.S. PATENT DOCUMENTS 5,596,346 A 1/1997 Leone et al.
10,958,869 B1 3/2021 Chi et al.

(Continued)

FOREIGN PATENT DOCUMENTS

CN 113850726 A 12/2021
DE 10 2018 117 938 A1 1/2020
WO 2019/132518 A1 7/2019

OTHER PUBLICATIONS

Communication dated Aug. 4, 2023, issued by the International Searching Authority in counterpart International Application No. PCT/KR2023/006826 (PCT/ISA/220, PCT/ISA/210, and PCT/ISA/237).

(Continued)

*Primary Examiner* — Andrae S Allison
(74) *Attorney, Agent, or Firm* — Sughrue Mion, PLLC

(57) ABSTRACT

A method 300B includes detecting a user input indicative of a trigger to modify the artifact of the image displayed at a user interface of an electronic device 100. Furthermore, the method 300B includes determining an artifact modification parameter based on a characteristic of the user input. Furthermore, the method 300B includes modifying the artifact in the image based on the artifact modification parameter.

18 Claims, 12 Drawing Sheets

(58) Field of Classification Search
CPC ... G06F 3/04883; G06V 10/235; G06V 10/82
See application file for complete search history.

(56) References Cited

U.S. PATENT DOCUMENTS

| | | | | |
|---|---|---|---|---|
| 2019/0236394 | A1* | 8/2019 | Price | G06V 10/454 |
| 2020/0394773 | A1* | 12/2020 | Wilensky | G06T 11/001 |
| 2021/0092280 | A1 | 3/2021 | Nishimura et al. | |
| 2021/0097691 | A1* | 4/2021 | Liu | G06T 11/60 |
| 2021/0295474 | A1* | 9/2021 | Wang | G06T 5/70 |
| 2022/0179026 | A1* | 6/2022 | Zaiss | G06T 7/11 |
| 2022/0270207 | A1* | 8/2022 | Chen | G06N 3/084 |
| 2022/0398700 | A1* | 12/2022 | K S | G06V 10/82 |
| 2023/0162332 | A1 | 5/2023 | Yang et al. | |
| 2023/0206411 | A1* | 6/2023 | Singh | H04N 9/79<br>382/100 |
| 2023/0267702 | A1* | 8/2023 | Choi | H04N 23/71<br>382/274 |
| 2024/0273904 | A1* | 8/2024 | Pawan Prasad | G06V 10/761 |
| 2025/0037248 | A1* | 1/2025 | Roheda | G06T 5/73 |
| 2025/0069237 | A1* | 2/2025 | S R | G06T 7/246 |

OTHER PUBLICATIONS

Baek et al., "Lightweight Image Enhancement Network for Mobile Devices Using Self-Feature Extraction and Dense Modulation," arXiv:2205.00853 [eess.IV], May 2022, Total 9 pages.
Baek et al., "Lightweight Image Enhancement Network for Mobile Devices Using Self-Feature Extraction and Dense Modulation" pp. 1-8 (8 pages total), submitted on May 2, 2022.
Communication issued Feb. 28, 2025 by the European Patent Office in European Patent Application No. 23807944.6.
Communication issued Apr. 7, 2025 by the Intellectual Property Office of India in Indian Patent Application No. 202241029283.
Communication issued on Apr. 28, 2026 by the Indian Patent Office in corresponding IN Patent Application No. 202241029283.

* cited by examiner

METHOD AND SYSTEM FOR IMAGE ARTIFACT MODIFICATION BASED ON USER INTERACTION

CROSS REFERENCE TO RELATED APPLICATIONS

This application is a continuation of international application PCT/KR2023/006826 filed May 19, 2023 and also claims priority to Indian Provisional Patent Application No. 202241029283 filed on May 20, 2022 and to Indian Patent Application No. 202241029283 filed on Apr. 6, 2023. The above applications are incorporated by reference.

FIELD

This application generally relates to image processing, and more specifically relates to a method and a system for image artifact modification based on user interaction.

BACKGROUND

Cameras have always been an important component of electronic devices (e.g., smartphones) and a key selling point for consumers. Today's smartphone cameras can compete with dedicated imaging devices due to the emergence of Artificial intelligence (AI) algorithms, improvements in multi-frame/multi-lens computational photography, more powerful processors, and neural processing units. In fact, the smartphones' comparatively small form factor is an advantage, as taking pictures and recording videos are becoming more integrated into consumers' daily lives as social media grows in popularity. As end-users/consumers transition from being content consumers to creators, the camera's role has shifted to that of a life tool. Existing electronic devices, however, have some limitations when it comes to the presence of image artifacts in a captured image. artifact Any features that appear in the captured image that are not present in the original imaged object are referred to as image artifacts. Image artifacts can occur because of improper operation of an imager/user, or as a result of natural processes or properties. For example, flashes are frequently used to capture a good image of a scene in low-light conditions. On the other hand, the flashes cause a variety of undesirable effects and artifacts (e.g., reflection). Users prefer these artifacts such as reflections to be removed. The existing electronic devices utilize a large neural network (e.g., Deep Neural Network (DNN)/Convolutional Neural Network (CNN)) to remove artifacts such as reflections. However, removing complex artifacts such as reflections from high-resolution images takes time. As a result, the user must wait for the large neural network to complete execution before viewing the results, resulting in a poor user experience. FIG. 1 is a flow diagram illustrating a standard deep learning-based method for an artifact correction, according to prior art. The standard deep learning-based method detects whether one or more user actions on the image are detected to remove the artifact (shown in dotted elliptical) or allows the user to touch a region to indicate a location of the artifact in the image. The detected artifact within the image is defined by the image's coordinates (e.g., x coordinate, y coordinate). The standard deep learning-based method then applies the larger neural network (e.g., heavy-weight artifact removal network) on the image's coordinates to remove the artifact entirely from the image. Because of the larger neural network running to perform the artifact correction, the user must wait for it to finish execution before viewing the results, resulting in a poor user experience.

Thus, it is desired to address the above-mentioned disadvantages or other shortcomings or at least provide a useful alternative for image artifact modification.

SUMMARY

This summary is provided to introduce a selection of concepts, in a simplified format, which is further described in the detailed description. This summary is neither intended to identify key or essential concepts of embodiments nor is it intended for determining the scope of embodiments.

According to an embodiment of the disclosure, an artificial intelligence (AI) based method to correct artifacts in an image or a video is disclosed. The method includes receiving at least one user input on at least a portion of the image or a video. Further, the method includes measuring one or more parameters including at least one of a speed, a length, a pressure, or a time duration of the at least one user input. Furthermore, the method includes activating at least one of a plurality of lightweight neural networks or activating at least one of a plurality of lightweight neural network layers of a lightweight neural network, wherein the plurality of lightweight neural networks and the plurality of lightweight neural network layers are pre-trained to correct the artifacts iteratively, in response to a measurement result of one or more artifact modification parameters, wherein the one or more artifact modification parameters are based on the at least one user input.

According to an embodiment of the disclosure, a method for modifying the artifact in the image is disclosed. The method includes detecting a user input, wherein the user input indicates a trigger to modify the artifact in the image. Further, the method includes determining an artifact modification parameter based on a characteristic of the user input. Furthermore, the method includes modifying the artifact in the image based on the artifact modification parameter.

According to an embodiment of the disclosure, a system for modifying the artifact in the image is disclosed. The system includes an image processing engine coupled with a processor, a memory, a communicator, a display, and a camera. The image processing engine is configured to detect the user input, wherein the user input indicates a trigger to modify the artifact of the image displayed at the user interface of the electronic device. Further, the image processing engine is configured to determine the artifact modification parameter based on the at least one characteristic of the user input. Furthermore, the image processing engine is configured to modify the artifact of the image based on the artifact modification parameter.

Provided herein is an artificial intelligence based method to correct artifacts in an image or a video, the method including: receiving at least one user input on at least a portion of the image or the video; measuring one or more parameters including at least one of a speed, a length, a pressure, or a time duration of the at least one user input; and activating at least one lightweight neural network from among a plurality of lightweight neural networks or activating one or more lightweight neural network layers of a second lightweight neural network, wherein the plurality of light weight neural networks and the second lightweight neural network are pre-trained to correct the artifacts iteratively, in response to a measurement result of one or more artifact modification parameters, wherein the one or more artifact modification parameters are based on the at least one user input.

Also provided herein is another method of modifying an artifact in an image, the method further including: detecting, by an electronic device, a user input, wherein the user input indicates a trigger to modify the artifact in the image; determining, by the electronic device, an artifact modification parameter based on a characteristic of the user input; and modifying, by the electronic device, the artifact in the image based on the artifact modification parameter.

In some embodiments, the another method further includes: estimating, by the electronic device, a first number of first neural networks or a second number of neural network layers of a second neural network to be executed based on the artifact modification parameter; and modifying, by the electronic device, the artifact in the image based on the estimating.

In some embodiments of the another method, the estimating further includes: estimating, by the electronic device, the first number or the second number based on a first speed of the user input; and estimating, by the electronic device, a second first number of the first neural networks or a second second number of the neural network layers based on a second speed of the user input, wherein a higher speed indicates less processing is to be performed to modify the artifact.

Also provided herein is a system for modifying an artifact in an image, the system including: a memory; a processor; a communicator; a display; a camera; and an image processing engine, operably connected to the memory the processor, the communicator, the display, and the camera configured to: detect a user input, wherein the user input indicates a trigger to modify the artifact of the image displayed at a user interface of an electronic device; determine an artifact modification parameter based on at least one characteristic of the user input; and modify the artifact of the image based on the artifact modification parameter.

To further clarify the advantages and features of embodiments, a more particular description will be rendered by reference to specific embodiments thereof, which are illustrated in the appended drawings. It is appreciated that these drawings depict only typical embodiments and are therefore not to be considered limiting of its scope. Embodiments will be described and explained with additional specificity and detail in the accompanying drawings.

BRIEF DESCRIPTION OF THE DRAWINGS

These and other features, aspects, and advantages of embodiments will become better understood when the following detailed description is read with reference to the accompanying drawings in which like characters represent like parts throughout the drawings, wherein.

Figure 1:
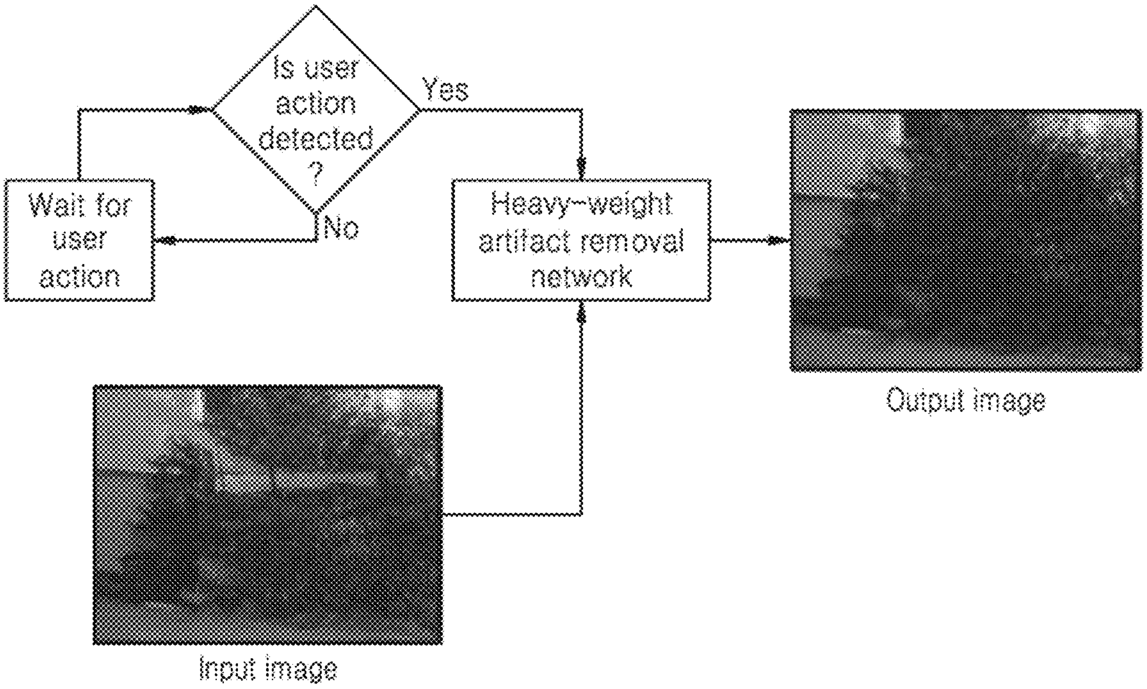
FIG. 1 is a flow diagram illustrating a standard deep learning-based method for an artifact correction, according to prior art.

Further, skilled artisans will appreciate those elements in the drawings are illustrated for simplicity and may not have necessarily been drawn to scale. For example, the flow charts illustrate the method in terms of the most prominent steps involved to help to improve understanding of aspects of embodiments. Furthermore, in terms of the construction of the device, one or more components of the device may have been represented in the drawings by conventional symbols, and the drawings may show only those specific details that are pertinent to understanding the embodiments so as not to obscure the drawings with details that will be readily apparent to those of ordinary skill in the art having the benefit of the description herein.

DETAILED DESCRIPTION OF FIGURES

For the purpose of promoting an understanding of the principles of embodiments, reference will now be made to the embodiment illustrated in the drawings and specific language will be used to describe the same. It will nevertheless be understood that no limitation of the scope of embodiments is thereby intended, such alterations and further modifications in the illustrated system, and such further applications of the principles as illustrated therein being contemplated as would normally occur to one skilled in the art.

It will be understood by those skilled in the art that the foregoing general description and the following detailed description are explanatory and are not intended to be restrictive thereof.

Reference throughout this specification to "an aspect", "another aspect" or similar language means that a particular feature, structure, or characteristic described in connection with the embodiment is included in at least one embodiment. Thus, appearances of the phrase "in an embodiment", "in another embodiment", and similar language throughout this specification may, but do not necessarily, all refer to the same embodiment.

The terms "comprise", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks that carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the embodiments. Likewise, the blocks of the embodiments may be physically combined into more complex blocks without departing from the scope of the embodiments.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "artifact" and "artifact" are used interchangeably. The terms "lightweight (LW) network(s)", "neural network(s)", and "neural network layer (s)" are used interchangeably. The terms "current level" and "current number" are used interchangeably.

Referring now to the drawings, and more particularly to FIGS. 2 to 10B, where similar reference characters denote corresponding features consistently throughout the figures, there are shown preferred embodiments.

Figure 2:
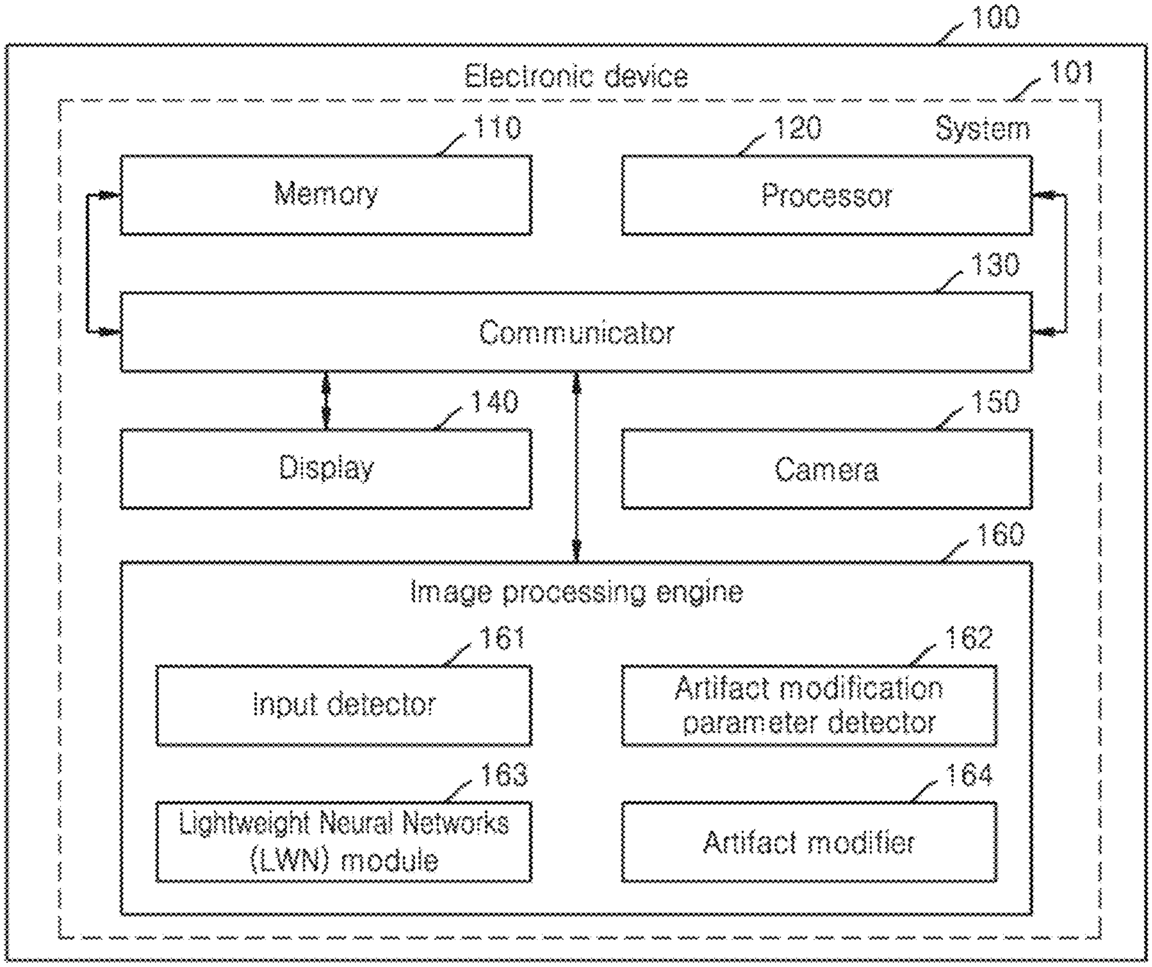
FIG. 2 illustrates a block diagram of an electronic device for modifying an artifact of an image, according to an embodiment as disclosed herein.

FIG. 2 illustrates a block diagram of an electronic device 100 for modifying an artifact of an image, according to an embodiment as disclosed herein. Examples of the electronic device 100 include, but are not limited to, a smartphone, a tablet computer, a Personal Digital Assistance (PDA), an Internet of Things (IoT) device, a wearable device, or any other electronic device capable of processing images or video data.

In an embodiment, the electronic device 100 comprises a system 101. The system 101 may include a memory 110, a processor 120, a communicator 130, a display 140, a camera 150, and an image processing engine 160.

In an embodiment, the memory 110 stores modified artifact(s). The memory 110 stores instructions to be executed by the processor 120 for modifying the artifacts in images, as discussed throughout the disclosure. The memory 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may, in some examples, be considered a non-transitory storage medium. The term "non-transitory" may indicate that the storage medium is not embodied in a carrier wave or a propagated signal. However, the term "non-transitory" should not be interpreted that the memory 110 is non-movable. In some examples, the memory 110 can be configured to store larger amounts of information than the memory. In certain examples, a non-transitory storage medium may store data that can, over time, change (e.g., in Random Access Memory (RAM) or cache). The memory 110 can be an internal storage unit, or it can be an external storage unit of the electronic device 100, a cloud storage, or any other type of external storage.

The processor 120 communicates with the memory 110, the communicator 130, the display 140, the camera 150, and the image processing engine 160. The processor 120 is configured to execute instructions stored in the memory 110 and to perform various processes to modify the artifacts in images, as discussed throughout the disclosure. The processor 120 may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator 130 is configured for communicating internally between internal hardware components and with external devices (e.g., server, another electronic device) via one or more networks (e.g., Radio technology). The communicator 130 includes an electronic circuit specific to a standard that enables wired or wireless communication. For example, the communicator 130 may be implemented with a processor such as a CPU, a memory containing instructions to be executed by the processor, and/or a custom hardware circuit or controller and specific hardware components such as oscillators, amplifiers and filters for implementing the wired or wireless communication.

The display 140 can accept user inputs to modify the artifacts in images and is made of a Liquid Crystal Display (LCD), a Light Emitting Diode (LED), an Organic Light Emitting Diode (OLED), or another type of display. The user input may include, but are not limited to, touch, swipe, drag, and gesture. The camera 150 includes one or more image sensors (e.g., Charged Coupled Device (CCD), Complementary Metal-Oxide Semiconductor (CMOS)) to capture one or more images/image frames/video to be processed for modifying one or more artifact(s) included in the image. In an alternative embodiment, the camera 150 may not be present, and the system 101 may process an image/video received from an external device or process a pre-stored image/video displayed at the display 140.

The image processing engine 160 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In one embodiment, the image processing engine 160 includes an input detector 161, an artifact modification parameter detector 162, a Lightweight Neural (LW) Networks controller 163, and an artifact modifier 164, collectively referred to as modules or units 161-164. The image processing engine 160 and one or more modules or units 161-164 in conjunction with the processor 120 may perform one or more functions or methods, as discussed throughout the present disclosure.

Figure 7:
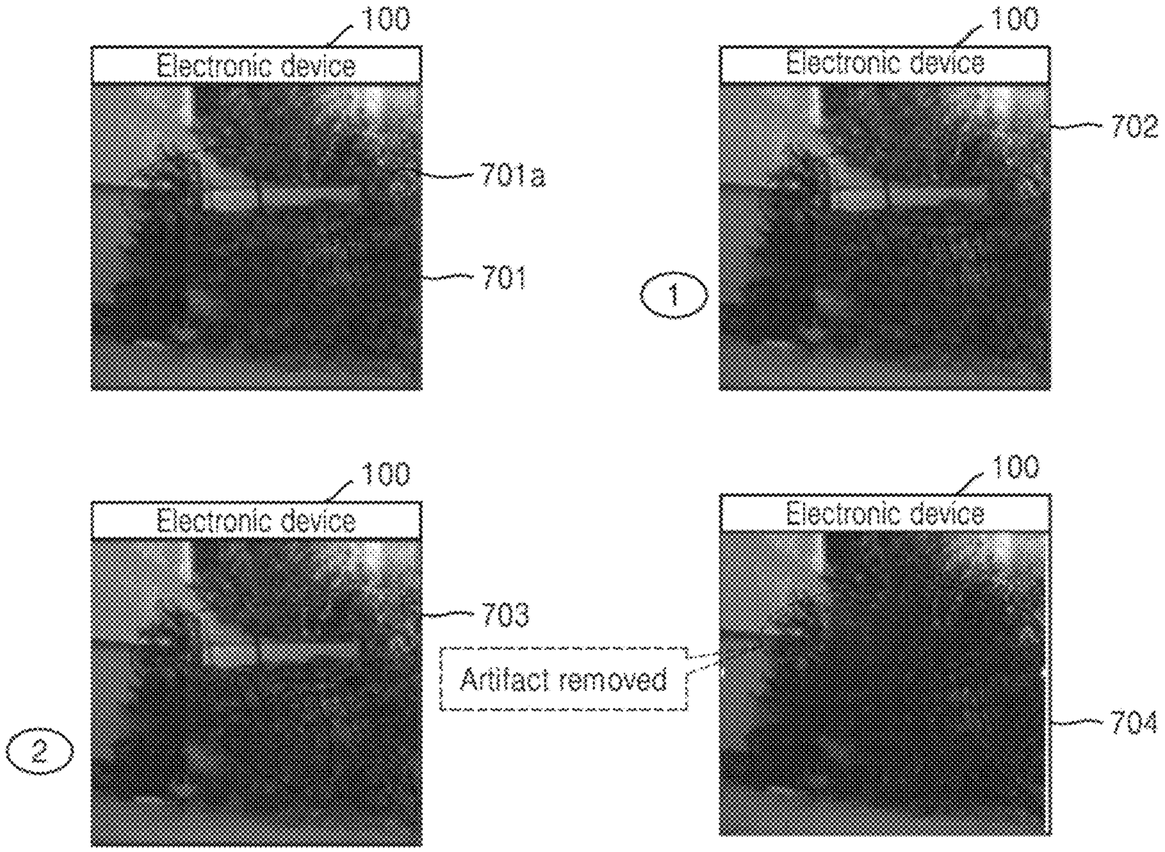
FIG. 7 is a scenario illustrating the method for reducing the strength of the artifact of the image based on the characteristic of the user input, according to an embodiment as disclosed herein.
Figure 9:
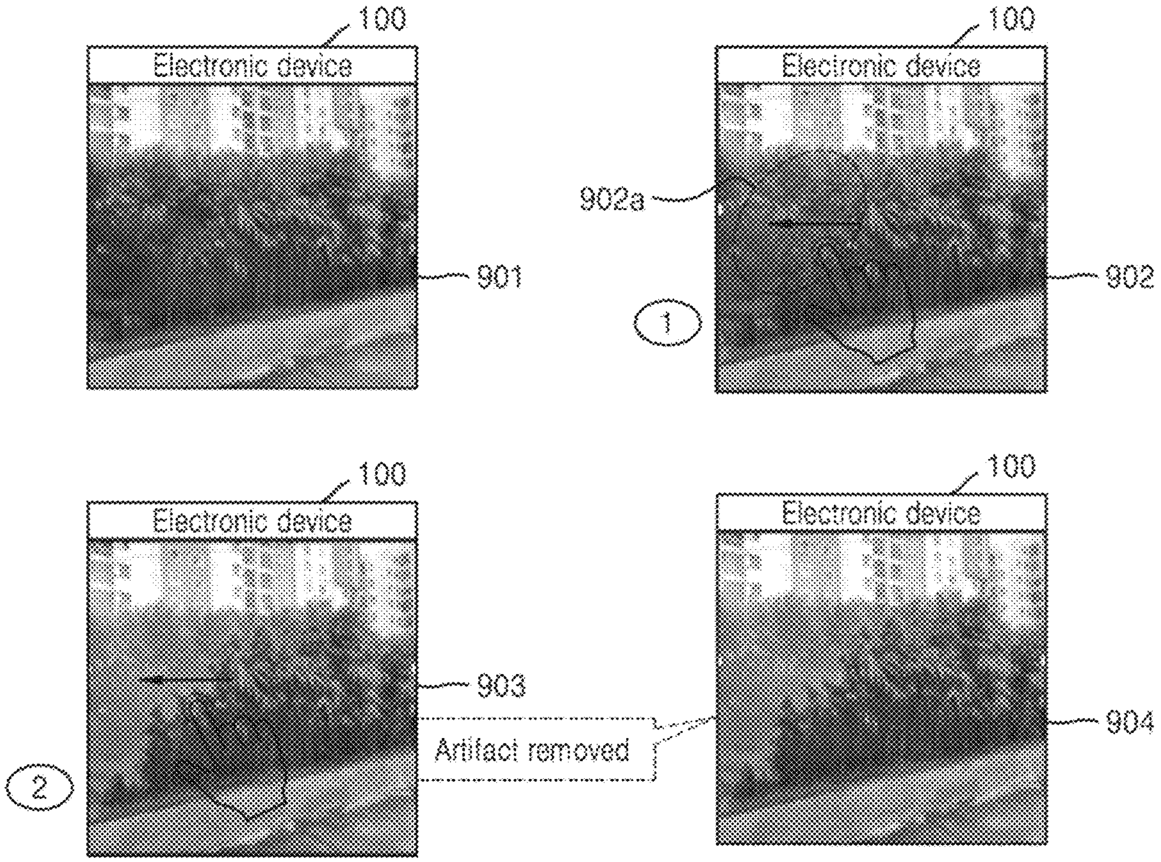
FIG. 9 is a scenario illustrating the method for increasing the strength of the artifact of the image based on the characteristic of the user input, according to an embodiment as disclosed herein.

In one embodiment, the input detector 161 detects a user input indicative of a trigger to modify an artifact in an image. The user input includes, for example, a swipe or touch or press gesture with a specific strength, a pen-based correction, a voice-based user input, etc. For example, when the input detector 161 detects a swipe gesture from left to right, the artifact modifier 164 reduces the artifact's strength, as shown in FIG. 7. In another example, when the input detector 161 detects the swipe gesture from right to left, the artifact modifier 164 boosts the strength of the artifact, as shown in FIG. 9. In another example, when the input detector 161 detects a light touch gesture on the display 140, the artifact modifier 164 reduces the strength of the artifact, as shown in FIG. 10.

Figure 5:
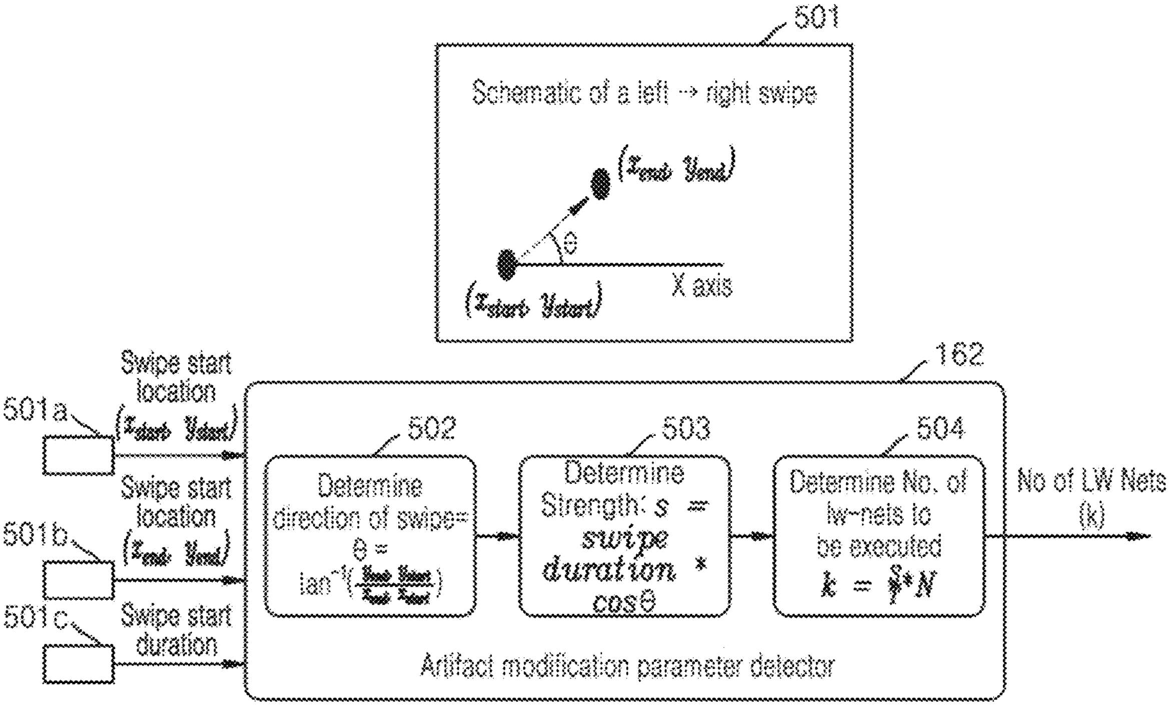
FIG. 5 illustrates a scenario where the electronic device estimates a number of LW networks to be executed based on an artifact modification parameter, according to an embodiment as disclosed herein.

In one embodiment, the artifact modification parameter detector 162 determines an artifact modification parameter based on a characteristic of the user input. The characteristic comprises at least one of a direction of the user input, a speed of the user input, a number of instances of a gesture performed, or a time duration of the user input. For example, the artifact modification parameter detector 162 determines the direction of the swipe gesture from a start and end coordinates of the swipe at the display 140 of the electronic device 100 to modify the artifact, as shown in FIG. 5. In another example, the artifact modification parameter detector 162 determines the speed of the user input, where fast swipes are used for finer artifact control and only one LW network is used for fast swipes to modify the artifact. Similarly, slow swipes are used for coarse control of artifacts and multiple LW networks are used for slow swipes to modify the artifact.

In one embodiment, the image processing engine 160 utilizes the one or more lightweight networks to modify the artifacts, which require significantly fewer computations to generate an output image compared to non-lightweight networks. Due to utilization of the lightweight networks, computational efficiency will increase by K times compared to the non-lightweight networks, where K is the number of lightweight networks to be executed based on the artifact modification parameter (S), an empirically chosen maximum swipe duration (T), and a maximum level of LW networks (N) available to modify the artifacts, as disclosed in equation 4.

Specifically, to determine the computational efficiency of a network (e.g., a lightweight or a non-lightweight network), multiply-accumulates (MACs)/pixels may be used. The MACs/pixel for a given Convolutional Neural Network (CNN) can be defined as shown in equation 1:

$$MACs_{pixel}^{C} = \sum_{i=1}^{n} \frac{\left(k_i^2 \times f_i^{in} \times f_i^{out}\right)}{s^2} \tag{1}$$

Here, $$MACs_{pixel}^{C}$$

represents the macs/pixel for the CNN (c), n represents the number of layers, $k_i$ represents the kernel size at layer i, $$f_i^{in}$$

represents a number of input features to layer i, $$f_i^{out}$$

represents the number of output features from layer i, and s represents a stride of convolution at layer i. So, for the lightweight networks, the total MACs/pixel will be much less than that of a regular deep network or said non-lightweight networks. The lightweight networks are designed such that one or a combination of the aspects (e.g., number of layers, number of features per layer, kernel size in each layer, etc.) of the network is much less than that of a regular deep network or said non-lightweight networks.

For example, a LW network may include three neural network layers or less with each layer including 5,000 neurons or less. A non-light weight neural network may include more than three neural network layers with each layer including 5,000 to 500,000 neurons.

In one embodiment, the LW network module 163 estimates at least one of a number of neural networks or a number of neural network layers of a neural network to be executed based on the artifact modification parameter, wherein each of the neural networks or each of the neural network layers of the neural network is configured to modify at least a part of the artifact. The number of neural network layers may be referred to as a second number. If a second artifact is being modified, the number of neural network layers may be referred to as a second second number.

The LW network module 163 estimates a first number of at least one of the neural networks or the neural network layers based on a first speed of the user input. The LW network module 163 estimates a second number of at least one of the neural networks or the neural network layers based on a second speed of the user input, wherein the first number is less than the second number, when the first speed is higher than the second speed of the user input. The LW network module 163 receives a start and an end coordinates of the user input, and a duration of the user input from the input detector 161. The LW network module 163 determines a direction of the user input from the start coordinates to the end coordinates. The LW network module 163 determines the artifact modification parameter based on the duration and the direction of the user input by utilizing the artifact modification parameter detector 162. The LW network module 163 estimates the at least one of the number of neural networks or the number of neural network layers to be executed based on the artifact modification parameter, a maximum swipe duration, and a maximum level of the at least one of the neural networks or the neural network layers available to modify the artifact, as described in conjunction with FIG. 5. Once the LW network module 163 estimates the at least one of the number of neural networks or the number of neural network layers, the same information is forwarded to the artifact modifier 164 to modify the artifact.

The artifact modifier 164 modifies the artifact in the image based on an execution of the estimated at least one of the number of neural networks or the number of neural network layers. The modification of the artifact in the image comprises one of reducing or increasing a strength of the artifact in the image based on the characteristic of the user input.

For reducing the strength of the artifact in the image, the artifact modifier 164 detects the artifact to be reduced based on a location (e.g. (x, y) coordinates of the user input (such as swipe or touch) on the display 140) and a type of the user input (e.g., a faster swipe from left to right, slower swipe from left to right, etc.). The artifact modifier 164 executes the estimated at least one of the number of neural networks or the number of neural network layers (K), as per equation 4, to reduce the detected artifact of the image to obtain an output image. The artifact modifier 164 provides the output image on the user interface of the electronic device 100.

For reducing the strength of the artifact in the image, the artifact modifier 164 performs various following steps. The artifact modifier 164 determines whether a current number (l) of executed at least one of neural networks or neural network layers is less than or equal to said maximum level (+N) of at least one of neural networks or neural network layers available for removing the artifact completely in response to detecting the user input, as described in conjunction with FIG. 6. The artifact modification parameter detector 162 determines artifact modification parameter, as described in conjunction with FIG. 5, based on the characteristic of the user input in response to determining that the current number (l) is less than or equal to a maximum level (+N) of at least one of neural networks or neural network layers available for removing the artifact completely. The artifact modifier 164 then estimates the number (K) of the at least one of the neural networks or the neural network layers to be executed based on the artifact modification parameter. The artifact modifier 164 increments the current number (l=l+K) from the number (K) of the executed at least one of the neural networks or the neural network layers.

The artifact modifier 164 then determines whether the incremented current number (l=l+K) is greater than a maximum index (i_max) of images in an output images list. The i_max of image may be updated based on the user input, as described in conjunction with FIG. 6. The artifact modifier 164 executes the estimated number (K) of the neural networks or the neural network layers to reduce the artifact in the image, thereby obtaining the output image when the incremented current number (l=l+K) is greater than the maximum index (i_max). Alternatively, the artifact modifier 164 retrieves the image from the output images list when the incremented current number (l=l+K) is equal to or less than the maximum index (i_max). The artifact modifier 164 then displays a modified artifact image on the display 140.

For example, at the initial stage, when l=0, K=0 and i_max=0, and the electronic device 100 may detect a first swipe as "left". When the first left swipe is detected, the electronic device 100 determines the number (e.g., K=3) of neural networks or neural network layers to be executed based on the artifact modification parameter, as shown in equation 4. As a result, the output images list on the electronic device 100 may now include three output images (modified output images). In this case, the i_max value is three. Now, if the electronic device 100 detects a second swipe as "right", then the electronic device 100 re-determines the number (e.g., K=2) of the at least one of the neural networks or the neural network layers to be executed based on the artifact modification parameter. In this case, if the electronic device 100 detects that the current value (e.g., l=1) is less than the previously stored i_max, then the image may be retrieved from the output images list by the electronic device 100. Take another case in which the electronic device 100 detects the initial swipe as "right" and the current level (l) is 3, and the i_max value is set to 3. Since then, the images from index 0-3 are now available in the image list. Assume that the electronic device 100 detects the second swipe as "left," and the current level (l) drops from 3 to 2, but the i_max remains at 3. If the electronic device 100 detects the third swipe as "left," and the current level (l) drops to −2 from 2, then i min is −2. The output images list now contains all images from index i_min to index i_max (i.e., −2 to 3).

For increasing the strength of the artifact in the image, the artifact modifier 164 detects the artifact to be increased based on the location and the type of the user input. The artifact modifier 164 executes the estimated at least one of the number of neural networks or the number of neural network layers (K), as per equation 4, to increase the detected artifact in the image to obtain an output image. The artifact modifier 164 provides the output image on the user interface of the electronic device 100.

For increasing the strength of the artifact in the image, the artifact modifier 164 performs various following steps. The artifact modifier 164 determines whether the current number (l) of the executed at least one of neural networks or neural network layers is greater than the minimum level (−N) (e.g., minimum level=−1*maximum level) of at least one of neural networks or neural network layers available for adding the artifact in response to detecting the user input, as described in conjunction with FIG. 8. The artifact modification parameter detector 162 determines the artifact modification parameter, as described in conjunction with FIG. 5, based on the characteristic of the user input in response to determining that the current number (l) of the executed at least one of neural networks or neural network layers is greater than the minimum level (−N) of at least one of neural networks or neural network layers. The artifact modifier 164 then estimates the number (K) of the at least one of the neural networks or the neural network layers to be executed based on the artifact modification parameter. The artifact modifier 164 decrements the current number (l=l−K) from the number (K) of the executed at least one of the neural networks or the neural network layers.

The artifact modifier 164 then determines whether the decremented current number (l=l−K) is lower than a minimum index of images (i_min) in the output image list. The i_min of image may be updated based on the user input, as described in conjunction with FIG. 8. The artifact modifier 164 executes the estimated number (K) of the neural networks or the neural network layers to boost the artifact in the image to obtain the output image when the decremented current number (l=l−K) is less than the minimum index (i_min). Alternatively, the artifact modifier 164 retrieves the image from the output images list when the decremented current number (l=l−K) is equal to or greater than the minimum index (i_min). The artifact modifier 164 then displays the modified artifact image on the display 140.

A function associated with the various components of the electronic device 100 may be performed through the non-volatile memory, the volatile memory, and the processor 120. The processor 120 controls the processing of the input data in accordance with a predefined operating rule or an AI model stored in the non-volatile memory and the volatile memory. The predefined operating rule or the AI model is provided through training or learning. Here, being provided through training means that, by applying a training algorithm to a plurality of training data, a predefined operating rule or AI model of the desired characteristic is made. The training may be performed in a device itself in which AI according to an embodiment is performed, and/or may be implemented through a separate server/system. The training algorithm is a method for training a predetermined target device using a plurality of training data to cause, allow, or control the target device to decide or predict. Examples of training algorithms may include, but are not limited to, supervised learning, unsupervised learning, semi-supervised learning, or reinforcement learning.

The AI model may consist of a plurality of neural network layers. Each layer has a plurality of weight values and performs a layer operation through a calculation of a previous layer and an operation of a plurality of weights. Examples of neural networks may include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks. Examples of the lightweight networks may include, but are not limited to, mobilenets, squeezenet, and computation-reducing networks (scale-space networks).

Although FIG. 2 shows various hardware components of the electronic device 100, but it is to be understood that other embodiments are not limited thereon. In other embodiments, the electronic device 100 may include less or more number of components. Further, the labels or names of the components are used only for illustrative purposes and do not limit the scope of the embodiments. One or more components can be combined to perform the same or substantially similar functions to modify the artifact of the image.

Figure 3A:
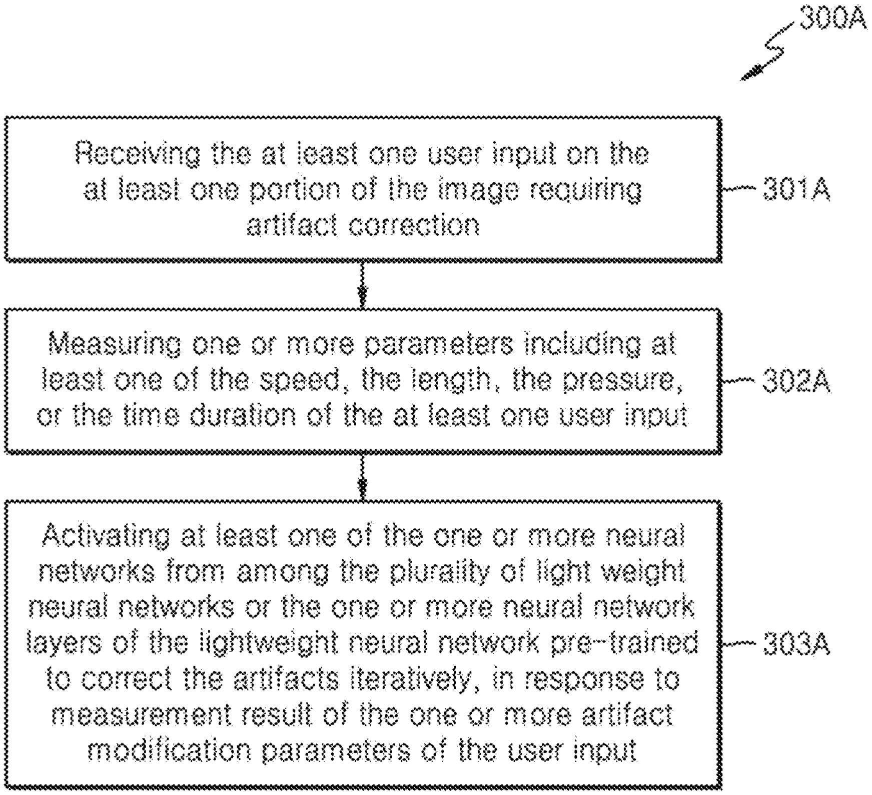
FIG. 3A is a flow diagram illustrating a method for modifying the artifact of the image, according to an embodiment as disclosed herein.

FIG. 3A is a flow diagram illustrating a method 300A for modifying the artifact of the image, according to an embodiment as disclosed herein. Steps (301A to 303A) may be performed by the system 101 of the electronic device 100 to modify the artifact of the image.

At step 301A, the method 300A includes receiving, by the input detector 161, the at least one user input on the at least one portion of the image requiring artifact correction.

At step 302A, the method 300A includes measuring, by the artifact modification parameter detector 162, one or more parameters including at least one of the speed, the length, the pressure, or the time duration of the at least one user input. Further, the method 300A may include determining a type among a plurality of types of the at least one user input, wherein each type of the at least one user action corresponds to a different type of artifact comprising a noise effect, a blur effect, or a reflection shadow in the image or the video.

At step 303A, the method 300A includes activating, by the LW network module 163, at least one of the one or more neural networks from among the plurality of lightweight neural networks or the one or more neural network layers of the lightweight neural network pre-trained to correct, by the artifact modifier 164, the artifacts iteratively, in response to the measurement result of one or more artifact modification parameters of the user input. Further, at step 303A, an extent of artifact correction in the image or the video by the activated one or more lightweight neural networks or the activated one or more lightweight neural network layers corresponds to: at least one of a weight of the corresponding activated one or more lightweight neural networks, or at least one of a number of the activated lightweight neural networks or a number of the activated lightweight neural network layers.

Figure 3B:
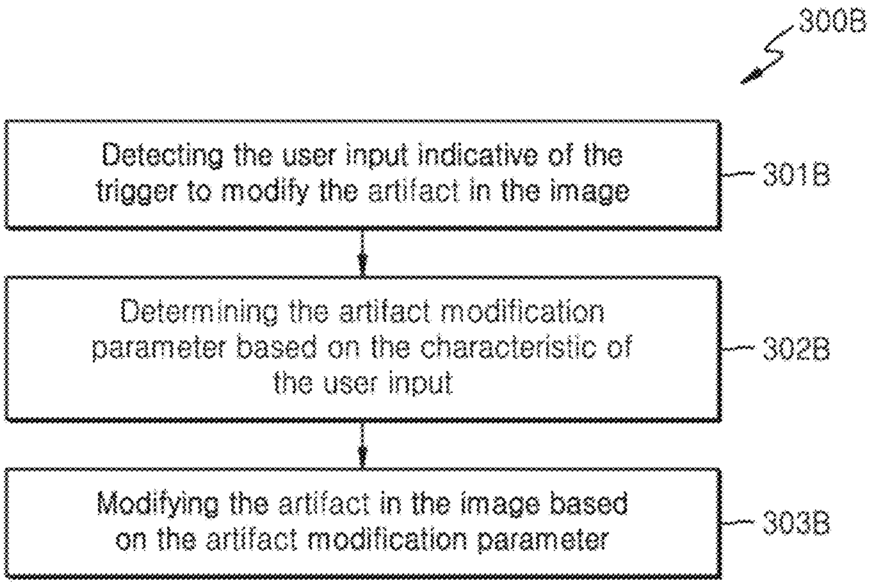
FIG. 3B is a flow diagram illustrating another method for modifying the artifact of the image, according to an embodiment as disclosed herein.

FIG. 3B is a flow diagram illustrating another method 300B for modifying the artifact of the image, according to an embodiment as disclosed herein. Steps (301B to 303B) may be performed by the system 101 of the electronic device 100 to modify the artifact of the image.

At step 301B, the method 300B includes detecting, by the input detector 161, the user input indicative of the trigger to modify the artifact in the image, step 301B relates to step 301A of FIG. 3A.

At step 302B, the method 300B includes determining, by the artifact modification parameter detector 162, the artifact modification parameter based on the characteristic of the user input, step 302B relates to step 302A of FIG. 3A.

At step 303B, the method 300B includes modifying, by the artifact modifier 164, the artifact in the image based on the artifact modification parameter, step 303B relates to step 303A of FIG. 3A. In an embodiment, which relates to sub-step of 303B, the modification of the artifact in the image based on the artifact modification parameter includes estimating, by the LW network module 163, at least one of the number of neural networks or the number of neural network layers of the neural network to be executed based on the artifact modification parameter, wherein each of the neural networks or each of the neural network layers of the neural network is configured to modify at least a part of the artifact, and modifying the artifact in the image based on an execution of the estimated at least one of the number of neural networks or the number of neural network layers.

In an embodiment, which relates to sub-step of 303B, estimating at least one of the number of neural networks or the number of neural network layers includes estimating the first number of at least one of the neural networks or the neural network layers based on the first speed of the user input, estimating the second number, wherein the first number is less than the second number of the at least one of the neural networks or the neural network layers, when the first speed is higher than the second speed of the user input; determining the artifact modification parameter based on the duration and the direction of the user input; and estimating the at least one of the number of neural networks or the number of neural network layers to be executed based on the artifact modification parameter, a maximum swipe duration, and a maximum level of the at least one of the neural networks or the neural network layers available to modify the artifact.

In an embodiment, which relates to sub-step of 303B, estimating at least one of the number of neural networks or the number of neural network layers includes receiving the start coordinates of the user input, the end coordinates of the user input, and the duration of the user input, determining the direction of the user input from the start coordinates and the end coordinates, determining the artifact modification parameter based on the duration and the direction of the user input, and estimating the at least one of the number of neural networks or the number of neural network layers to be executed based on the artifact modification parameter, a maximum swipe duration, and the maximum level of the at least one of the neural networks or the neural network layers available to modify the artifact.

In an embodiment, which relates to sub-step of 303B, modifying the artifact in the image comprises one of reducing or increasing a strength of the artifact in the image based on the characteristic of the user input.

In an embodiment, which relates to sub-step of 303B, when modifying the artifact comprises reducing the strength of the artifact in the image includes detecting the artifact to be reduced based on a location and a type of the user input, executing the estimated at least one of the number of neural networks or the number of neural network layers (K), as per equation 4, to reduce the detected artifact in the image to obtain an output image, and providing the output image on the user interface of the electronic device 100.

Figure 6:
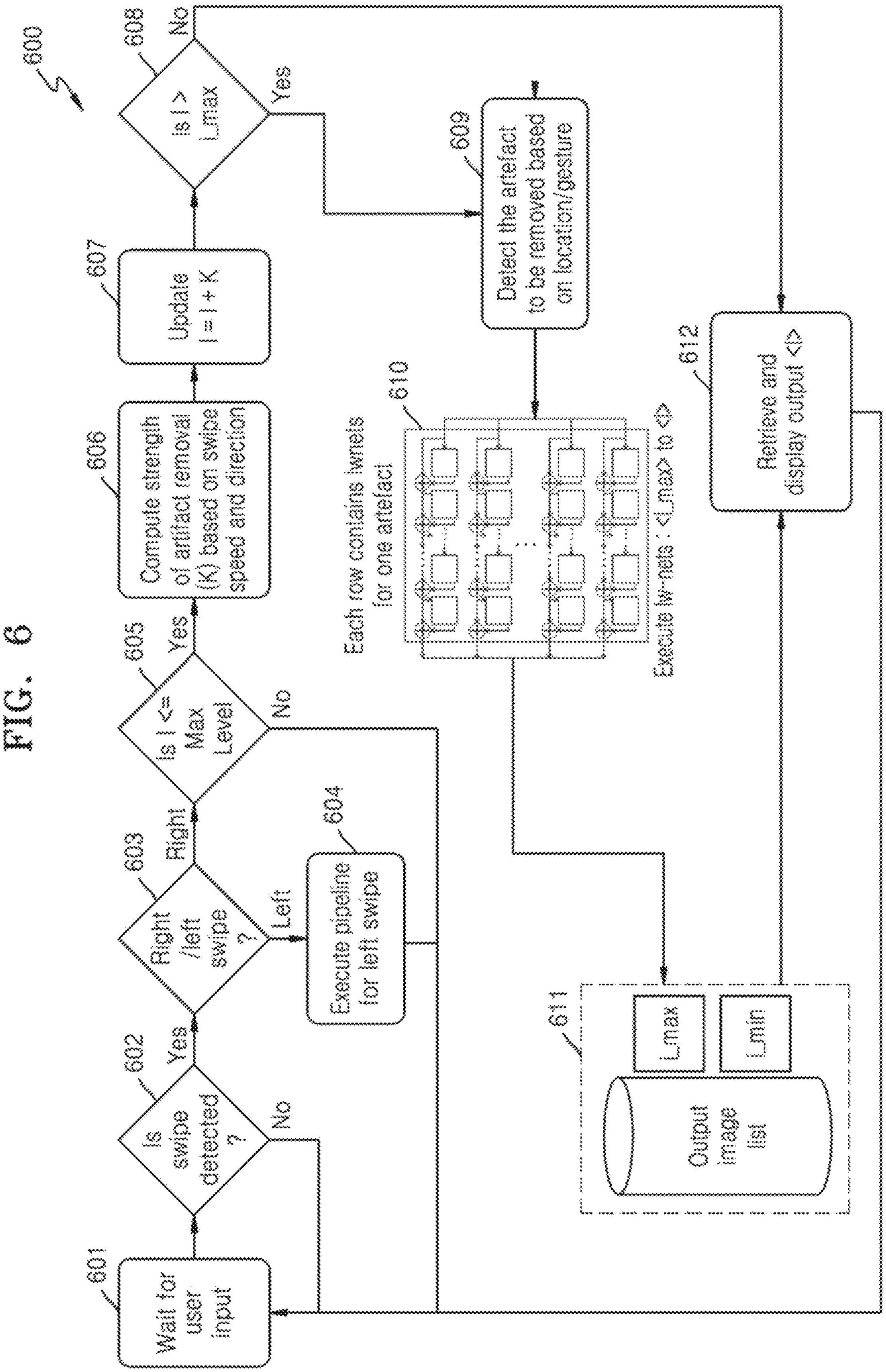
FIG. 6 is a flow diagram illustrating a method for reducing the strength of the artifact of the image based on the characteristic of the user input, according to an embodiment as disclosed herein.

In an embodiment, which relates to sub-step of 303B, when modifying the artifact comprises reducing the strength of the artifact in the image, as described in conjunction with FIG. 6, includes saving the output image in the output image list, updating the maximum index (i_max) of images for the output image list to the number of the executed at least one of the number of neural networks or the number of neural network layers, detecting another user input corresponding to the output image. Further, the method 300B includes determining whether the current number (l) of the executed at least one of neural networks or neural network layers is less than or equal to the total number or said maximum level (+N) of at least one of neural networks or neural network layers available for removing the artifact completely in response to detecting the other user input corresponding to the output image. Further, the method 300B includes in response to determining that the current number (l) is less than or equal to the maximum level (+N) of at least one of neural networks or neural network layers available for removing the artifact completely, determining another artifact modification parameter based on the characteristic of the another user input. Further, the method 300B includes estimating another number of the at least one of the neural networks or the neural network layers to be executed based on the another artifact modification parameter. Further, the method 300B includes incrementing the current number (l=l+K) from the number (K) of the executed at least one of the neural networks or the neural network layers by the estimated number of another number of the at least one of the neural networks or the neural network layers. Further, the method 300B includes determining whether the incremented current number (l=l+K) is greater than the maximum index (i_max) of images in the output images list. Further, the method 300B includes detecting another artifact to be reduced based on the location and the type of the other user input in response to determining that the current level (l) is greater than the maximum index (i_max) of images. Further, the method 300B includes executing the estimated another number (K) of the neural networks or the neural network layers to reduce the other artifact in the image to obtain another output image. Further, the method 300B includes retrieving and displaying, by the electronic device 100, at the user interface, the other output image.

Figure 8:
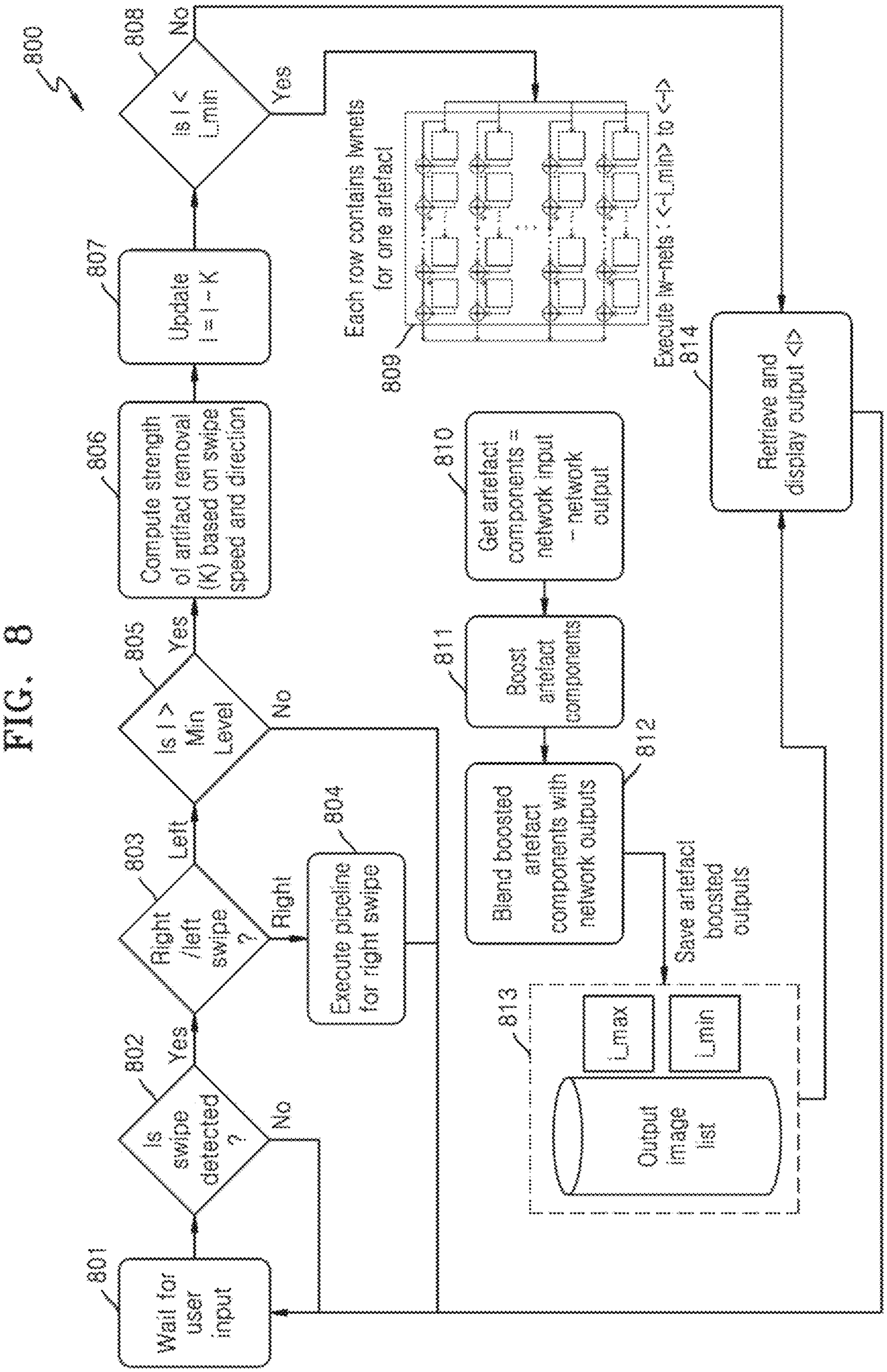
FIG. 8 is a flow diagram illustrating a method for increasing the strength of the artifact of the image based on the characteristic of the user input, according to an embodiment as disclosed herein.

In an embodiment, relates to sub-step of 303B, when modifying the artifact comprises increasing the strength of the artifact in the image, as described in conjunction with FIG. 8, which includes detecting the artifact to be increased based on the location and the type of the user input, executing the estimated at least one of the number of neural networks or the number of neural network layers to increase the detected artifact in the image to obtain the output image, and providing the output image on the user interface of the electronic device 100. Further, the method 300B includes saving the output image in the output image list. Further, the method 300B includes updating the minimum index (i_min) of images for the output image list to the number (K) of the executed at least one of the number of neural networks or the number of neural network layers. Further, the method 300B includes detecting another user input corresponding to the output image. Further, the method 300B includes determining whether the current number (l) of the executed at least one of neural networks or neural network layers is greater than the total number or said minimum level (−N) of at least one of neural networks or neural network layers available for adding the artifact in response to detecting the other user input corresponding to the output image. Further, the method 300B includes adding the artifact in response to determining that the current number (l) is greater than the minimum level (−N) of at least one of neural networks or neural network layers available. Further, the method 300B includes determining another artifact modification parameter based on the characteristic of the another user input. Further, the method 300B includes estimating another number (K) of the at least one of the neural networks or the neural network layers to be executed based on the another artifact modification parameter. Further, the method 300B includes decrementing the current number (l=l−K) from the number (K) of the executed at least one of the neural networks or the neural network layers by the estimated number of another number of the at least one of the neural networks or the neural network layers. Further, the method 300B includes determining whether the decremented current number (l=l−K) is lower than the minimum index (i_min) of images in the output image list. Further, the method 300B includes detecting another artifact to be increased based on the location and the type of the other user input in response to determining that the current number (l) is lower than the minimum index (i_min) of images. Further, the method 300B includes executing the estimated another number (K) of the neural networks or the neural network layers to increase the other artifact in the image to obtain another output image. Further, the method 300B includes retrieving and displaying at the user interface, the other output image.

Figure 4:
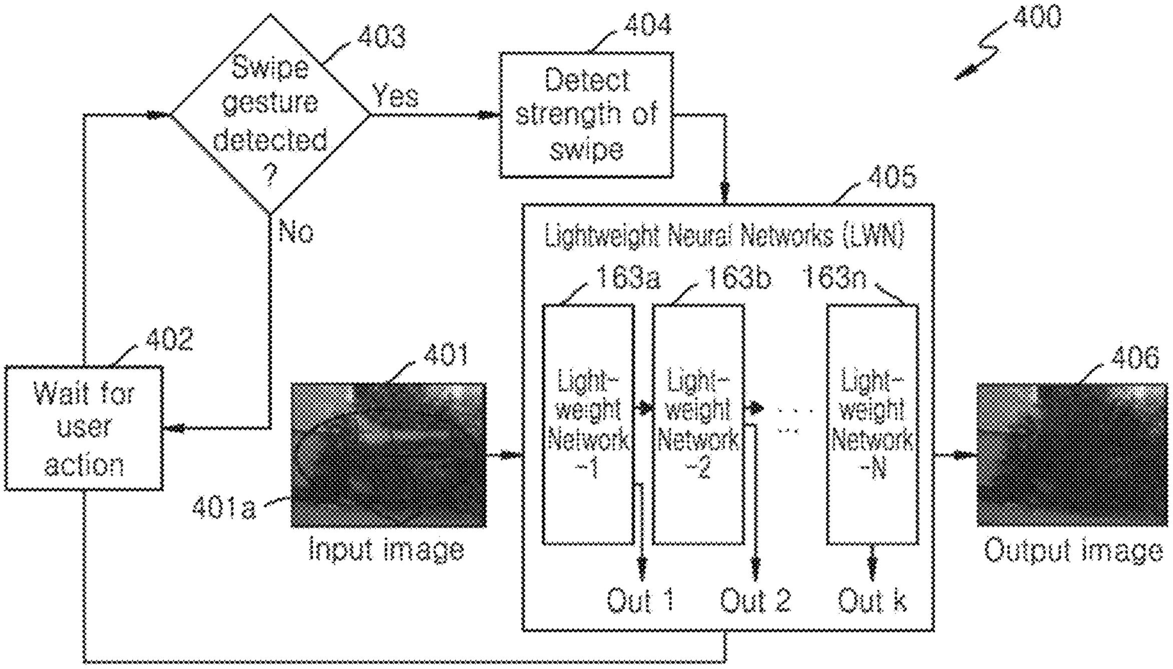
FIG. 4 is a schematic flow diagram illustrating the method for modifying the artifact of the image based on one or more user gestures using one or more Lightweight Neural (LW) Networks, according to an embodiment as disclosed herein.

FIG. 4 is a schematic flow diagram illustrating the method 400 for modifying the artifact of the image based on one or more user gestures using one or more LW network 163, according to an embodiment as disclosed herein.

At step 401, consider a scenario where the electronic device 100 captures/receives the image and/or displays the image on a screen (i.e., display 140) of the electronic device 100, where the image includes one or more artifacts, which relates to step 301A. At step 402 and step 403, the input detector 161 determines whether a trigger indication, user input or user action (e.g., the swipe gesture 401*a*) to modify the artifact 401*a* of the image is received from the user of the electronic device 100, which relates to step 301A. At step 404, the artifact modification parameter detector 162 determines the artifact modification parameter based on the characteristic of the user input or user action in response to determining that the trigger indication, user input or user action (e.g., the swipe gesture) to modify the artifact of the image is received from the user of the electronic device 100, which relates to step 302A. At step 405 and step 406, the LW network module 163 estimates the number of LW networks (e.g., LW network-1 (163*a*), LW network-2 (163*b*) . . . , LW network-n (163*n*)) to be executed/activated based on the artifact modification parameter, where each of the LW networks is configured to modify at least the part of the artifact, which relates to step 303A. The artifact modifier 164 modifies the artifact based on the number of executed/activated LW networks. The artifact modifier 164 then displays the output image at the user interface, where the output image includes a modified artifact.

FIG. 5 illustrates a scenario where the electronic device 100 estimates the number of LW networks to be executed based on the artifact modification parameter, according to an embodiment as disclosed herein.

In this scenario at step 501, the user of the electronic device 100 swipes from left to right on the display 140 (See FIG. 2), which is detected by the input detector 161, which relates to step 301A. Then, the input detector 161 determines the start coordinates of the swipe gesture 501*a*, end coordinates of the swipe gesture 501*b* and duration of the swipe gesture 501*c*. The input detector 161 then forwards these values to the artifact modification parameter detector 162. At step 502, the artifact modification parameter detector 162 then determines the direction of the swipe gesture from the start coordinates of the swipe gesture 501*a* and end coordinates of the swipe gesture 501*b*, which relates to step 302A, using equation 2.

$$\text{Swipe direction}(\theta) = \tan^{-1}\left(\frac{y_{end} - y_{start}}{x_{end} - x_{std}}\right) \tag{2}$$

At step 503, the artifact modification parameter detector 162 then determines the artifact modification parameter based on the duration of the swipe gesture 501*c* and the direction of the swipe gesture, which relates to step 302A, using equation 3.

$$\text{Artifact modification parameter } (S) = \text{swipe duration } (T) * \cos\theta \tag{3}$$

At step 504, the artifact modification parameter detector 162 then determines the number of LW networks (K) to be executed based on the artifact modification parameter (S), the empirically chosen maximum swipe duration (T), and the maximum level of LW networks (N) available to modify the artifact, which relates to step 302A, using equation 4.

$$K = \frac{S}{T} * N \tag{4}$$

The number of LW networks (K) to be executed is directly proportional to the swipe duration, since faster swipes lead to finer control (less K). The direction of the swipe is taken into account while determining swipe strength, since a swipe not parallel to the x-axis should be weighed less. The maximum value of swipe duration (T) is empirically chosen, for example, to be 3 seconds to compute K. N is the number of LW networks that can be executed such that $N \cdot t < 100$ milliseconds. Here, T represents the execution time for a single LW network.

FIG. 6 is a flow diagram illustrating a method 600 for reducing the strength of the artifact of the image based on the characteristic of the user input, according to an embodiment as disclosed herein. The electronic device 100 performs various steps (step 601 to step 612) to reduce the strength of the artifact of the image based on the characteristic of the user's action. The method 600 includes multiple pathways of the lightweight neural networks 610, where each path includes a specific number of the lightweight neural networks (e.g., $LW_1$, $LW_2$, $LW_3$, $LW_4$ . . . $LW_N$). Each path has a unique feature that reduces the strength of the artifact. For example, a first row/path of the lightweight neural networks 610 includes a reflection removal functionality, while a second row/path of the lightweight neural networks 610 includes a shadow reflection removal functionality.

At step 601 and step 602, the method 600 includes determining whether any trigger indication, user input or user action (e.g., the swipe gesture) and/or another user input or user action to modify the artifact of the image is received from the user of the electronic device 100/detected at the electronic device 100, which relates to step 301A.

At step 603, the method 600 includes determining the start coordinates of the swipe gesture 501*a* (See FIG. 5) and the end coordinates of the swipe gesture 501*b* (See FIG. 5) of the swipe gesture, as well as the duration of the swipe gesture 501*c* (See FIG. 5) and determining the direction (e.g., right, or left) of the swipe gesture from the start coordinates 501*a* and the end coordinates 501*b* in response to determining that any trigger indication/user input (e.g., the swipe gesture) and/or another user input to modify the artifact of the image is received from the user of the electronic device 100.

At step 604, the method 600 includes performing, by the electronic device 100, various steps (i.e., step 805 to step 814) in response to determining that the swipe gesture's direction is "left", which relates to step 303A.

At step 605, the method 600 includes determining whether the current level (l) of executed LW networks is lower than or equal to the total number of LW networks (N) for completely removing the artifact in response to determining that the swipe gesture's direction is "right", where the current level (l) will update each time based on the swipe gesture, which relates to step 302A. For example, at an initial stage, the current level of executed LW network (e.g., l=0) is less than or equal to the total number of LW networks (e.g., N=10 to −10). The current level of executed LW network depends on the total number of LW network used for reducing the artifact. The method 600 performs steps 606 to 612 to reduce the strength of the image artifact.

At step 606, the method 600 includes determining the artifact modification parameter based on the characteristic of the user input and/or the another modification strength factor based on the characteristic of another user input in response to determining that the current level of executed LW network (e.g., l=0) is lower than or equal to the total number of LW networks (e.g., N=+10) available for completely removing the artifact, which relates to step 302A. Further, the method 600 includes estimating the number (K) of LW networks to be executed based on the artifact modification parameter and/or another number of LW networks to be executed based on another artifact modification parameter. For example, as per equation 4, a value of the artifact modification parameter (S) is 0.25, the empirically chosen maximum swipe duration (T) is one second, and the total number of LW networks is N (e.g., N=20). Then, the electronic device 100 executes N/4 (K. e.g., K=5) LW networks to remove the artifact in this example scenario.

At step 607, the method 600 includes incrementing the current level (i.e., l=l+K) based on the artifact modification parameter (S), which relates to step 303A.

At step 608, the method 600 includes determining whether the current level (l=l+K) is greater than the maximum index of images (i_max) in the output images list, i_max, and/or i_min indicates maximum and minimum image index values in the output image list which relates to step 303A.

At step 609, the method 600 includes detecting artifact and/or another artifact to be reduced based on the location and the type of the other user input in response to determining that the current level (l) is greater than the maximum index of images (i_max), which relates to step 303A. The method also includes classifying the determined artifact and/or another artifact. At step 610, the method 600 includes executing the estimated number (K) of LW networks to reduce the other artifact of the image to obtain the output image when the incremented current number (l=l+K) is greater than the maximum index (i_max), which relates to step 303A.

In one embodiment, the method 600 includes executing one or more rows of the LW network 610 that corresponds to the detected artifact and/or another artifact, where each path includes a plurality of blocks, and each block represents one LW network that activates based on the characteristic of the user input, the artifact modification parameter and/or another artifact modification parameter.

At step 611 and step 612, the method 600 includes retrieving the output image or another output image from the output image list of the memory 110 when the incremented current number (l=l+K) is equal to or less than the maximum index (i_max) and displaying the output image or another output image at the user interface of the electronic device 100, which relates to step 303A.

FIG. 7 is a scenario illustrating the method for reducing the strength of the artifact of the image based on the characteristic of the user input, according to an embodiment as disclosed herein. The electronic device 100 performs various steps (701 to 704) to reduce the strength of the artifact of the image based on the characteristic of the user's action.

At step 701, consider a scenario where the electronic device 100 captures/receives the image and/or displays the image on the screen (i.e., display 140, See to FIG. 2) of the electronic device 100, where the image includes one or more artifacts 701*a*, which relates to step 301A. At step 702, the electronic device 100 detects trigger indication or user input (e.g., the swipe gesture from left to right ①) to modify the artifact of the image received from the user of the electronic device 100, where the sign "①" indicates that the user of the electronic device 100 swipes first time on the display 140 to reduce the strength of the artifact, which relates to step 303A. The electronic device 100 determines the artifact modification parameter based on the characteristic of the user input and estimates the number of LW networks to be executed/activated based on the artifact modification parameter. The electronic device 100 then modifies the artifact based on the number of executed/activated LW networks. The electronic device 100 then displays the output image at the user interface, where the output image includes the modified artifact.

At step 703, the electronic device 100 detects another trigger indication or another user input (e.g., the swipe gesture from left to right ②) to further modify the modified artifact of the image, where the sign "②" indicates that the user of the electronic device 100 swipes second time on the display 140 to further reduce the strength of the modified artifact, which relates to step 303A. The electronic device 100 determines another artifact modification parameter based on the characteristic of the user input and estimates another number of LW networks to be executed/activated based on another artifact modification parameter. The electronic device 100 then modifies the artifact based on another number of executed/activated LW networks. At step 704, the electronic device 100 then displays another output image at the user interface, where another output image includes the modified artifact. In other words, the artifact 701*a* was completely or partially removed based on the user's action, which relates to step 303A.

In another embodiment, the disclosed method includes two features such as find control feature and coarse control feature. Fine control feature means that fast swipe is used for finer control of artifacts and only one LW network is used for fast swipe. Coarse control feature means that slow swipe is used for coarse control of artifacts and multiple LW networks are used for slow swipe.

FIG. 8 is a flow diagram illustrating a method 800 for increasing the strength of the artifact of the image based on the characteristic of the user input, according to an embodiment as disclosed herein. The electronic device 100 performs various steps (step 801 to step 814) to increase/boost the strength of the artifact of the image based on the characteristic of the user's action. The method 800 includes multiple pathways of the lightweight neural networks 809, where each path includes the number of the lightweight neural networks (e.g., $LW_1$, $LW_2$, $LW_3$, $LW_4$ . . . $LW_N$). Each path has a unique feature that increases the strength of the artifact. For example, a first row/path of the lightweight neural networks 809 includes a reflection boost functionality, while a second row/path of the lightweight neural networks 809 includes a shadow reflection boost functionality.

At step 801 and step 802, the method 800 includes determining whether any trigger indication, user input or user action (e.g., the swipe gesture) and/or another user input to modify the artifact of the image is received from the user of the electronic device 100 or detected at the electronic device 100, which relates to step 301A of FIG. 3A.

At step 803, the method 800 includes determining the start coordinates of the swipe gesture 501*a* (See FIG. 5) and end coordinates of the swipe gesture 501*b* (See FIG. 5) of the swipe gesture, as well as the duration of the swipe gesture 501*c* (See FIG. 5) of the swipe gesture and determining the direction (e.g., right, or left) of the swipe gesture from the start coordinates 501*a* and the end coordinates 501*b* in response to determining that any trigger indication/user input (e.g., the swipe gesture) and/or another user input to modify the artifact of the image is received from the user of the electronic device 100/displayed on the electronic device 100, which relates to step 301A of FIG. 3A.

At step 804, the method 800 includes performing, by the electronic device 100, various steps (i.e., step 605 to step 612) in response to determining that the swipe gesture's direction is "right", which relates to step 303A of FIG. 3A.

At step 805, the method 800 includes determining whether the current level (l) of executed LW networks is greater than the minimum level of LW networks (−N) available for completely boosting the artifact in response to determining that the swipe gesture's direction is "left", where the current level (l) will update each time based on the swipe gesture, which relates to step 303A of FIG. 3A. For example, at an initial stage, the current level of executed LW network (e.g., l=0) is greater than the minimum level (e.g., N=(−10)). As a result, the method 800 performs steps 806 to 814 to increase the strength of the image artifact.

At step 806, the method 800 includes determining the artifact modification parameter based on the characteristic of the user input and/or another modification strength factor based on the characteristic of another user input in response to determining that the current level (l) of executed LW networks is greater than the minimum level (e.g., N=(−10)), which relates to step 302A of FIG. 3A. Further, the method 800 includes estimating the number (K) of LW networks to be executed based on the artifact modification parameter and/or estimating another number of LW networks to be executed based on another artifact modification parameter. For example, as per equation 4 of FIG. 5, a value of the artifact modification parameter (S) is 0.25, the empirically chosen maximum swipe duration (T) is one second, and the total number of LW networks is N (e.g., N=20). Then, the electronic device 100 executes N/4 LW networks (K, e.g., K=5) to boost the artifact in this example scenario.

At step 807, the method 800 includes decrementing the current level (i.e., l=l−K), which relates to step 303A of FIG. 3A.

At step 808, the method 800 includes determining whether the current level (l−K) is lower than the maximum index of images (i_min) in the output images list, which relates to step 303A of FIG. 3A.

At step 809, the method 800 includes detecting artifact and/or another artifact to be boosted based on the location and the type of the other user input in response to determining that the current level (l) is lower than the minimum index (i_min) of images and executing the estimated another number of LW networks to reduce the other artifact of the image to obtain the output image and/or executing the estimated another number of LW networks to boost the other artifact of the image to obtain another output image, which relates to step 303A of FIG. 3A. The method includes executing one or more rows of the LW networks 809 that correspond to the detected artifact and/or another artifact, where each path includes the plurality of blocks, and each block represents one LW network that activates based on the characteristic of the user input, the artifact modification parameter and/or another artifact modification parameter.

At step 810, step 811 and step 812, the method 800 includes determining another artifact modification parameter based on input/output (809) of the LW network module 163 to boost the artifact and/or another artifact of the image to obtain another output image, which relates to step 303A of FIG. 3A.

At step 813, and step 814, the method 800 includes retrieving the output image/another output image from the output image list of the memory 110 when the decremented current number (l=l−K) is greater than the minimum index (i_min) and displaying the output image/another output image at the user interface of the electronic device 100, which relates to step 303A of FIG. 3A.

FIG. 9 is a scenario illustrating the method for increasing the strength of the artifact of the image based on the characteristic of the user input, according to an embodiment as disclosed herein. The electronic device 100 performs various steps (901 to 904) to increase/boost the strength of the artifact of the image based on the characteristic of the user's action.

At step 901, consider a scenario where the electronic device 100 captures or receives the image and/or displays the image on the screen (i.e., display 140) of the electronic device 100, where the image includes one or more artifacts but the strength of the one or more artifacts is very low, which relates to step 301A of FIG. 3A. At step 902, the electronic device 100 detects trigger indication or user input (e.g., the swipe gesture from right to left ①) to modify the artifact (902*a*) of the image received from the user of the electronic device 100, where the sign "①" indicates that the user of the electronic device 100 swipes first time on the display 140 to boost the strength of the artifact, which relates to step 303A of FIG. 3A. The electronic device 100 determines the artifact modification parameter based on the characteristic of the user input and estimates the number of LW networks to be executed/activated based on the artifact modification parameter. The electronic device 100 then modifies the artifact based on the number of executed/activated LW networks. The electronic device 100 then displays the output image at the user interface, where the output image includes the modified artifact.

At step 903, the electronic device 100 detects another trigger indication/another user input (e.g., the swipe gesture from right to left ②) to further modify the modified artifact of the image, where the sign "②" indicates that the user of the electronic device 100 swipes second time on the display 140 to further boost the strength of the modified artifact, which relates to step 303A of FIG. 3A. The electronic device 100 determines another artifact modification parameter based on the characteristic of the user input and estimates another number of LW networks to be executed/activated based on another artifact modification parameter. The electronic device 100 then modifies the artifact based on another number of executed/activated LW networks. At step 904, the electronic device 100 then displays another output image at the user interface, where another output image includes the modified artifact, which relates to step 303A of FIG. 3A. In other words, the artifact (902*a*) was completely or partially added based on the user's action.

Figure 10A:
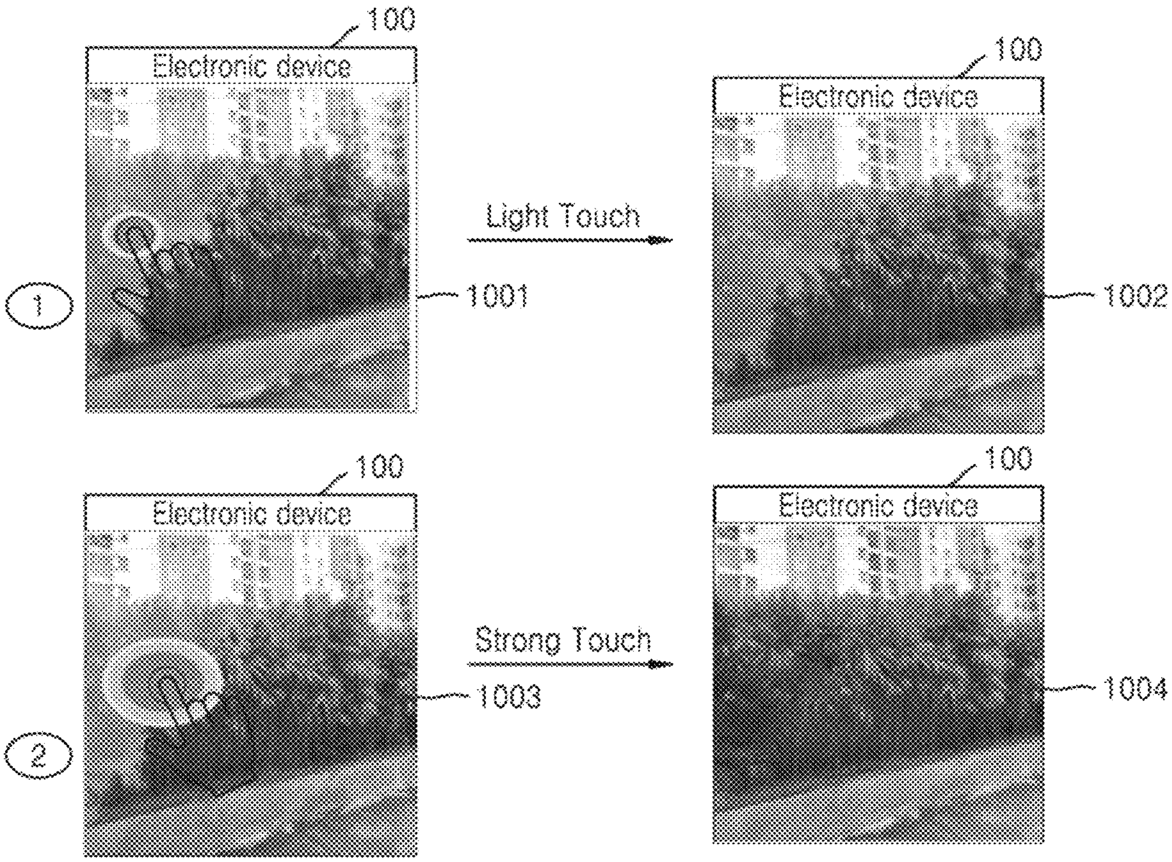
FIG. 10A-10B are scenarios illustrating the method for reducing the strength of the artifact of the image based on the characteristic of the user input, according to another embodiment as disclosed herein.
Figure 10B:
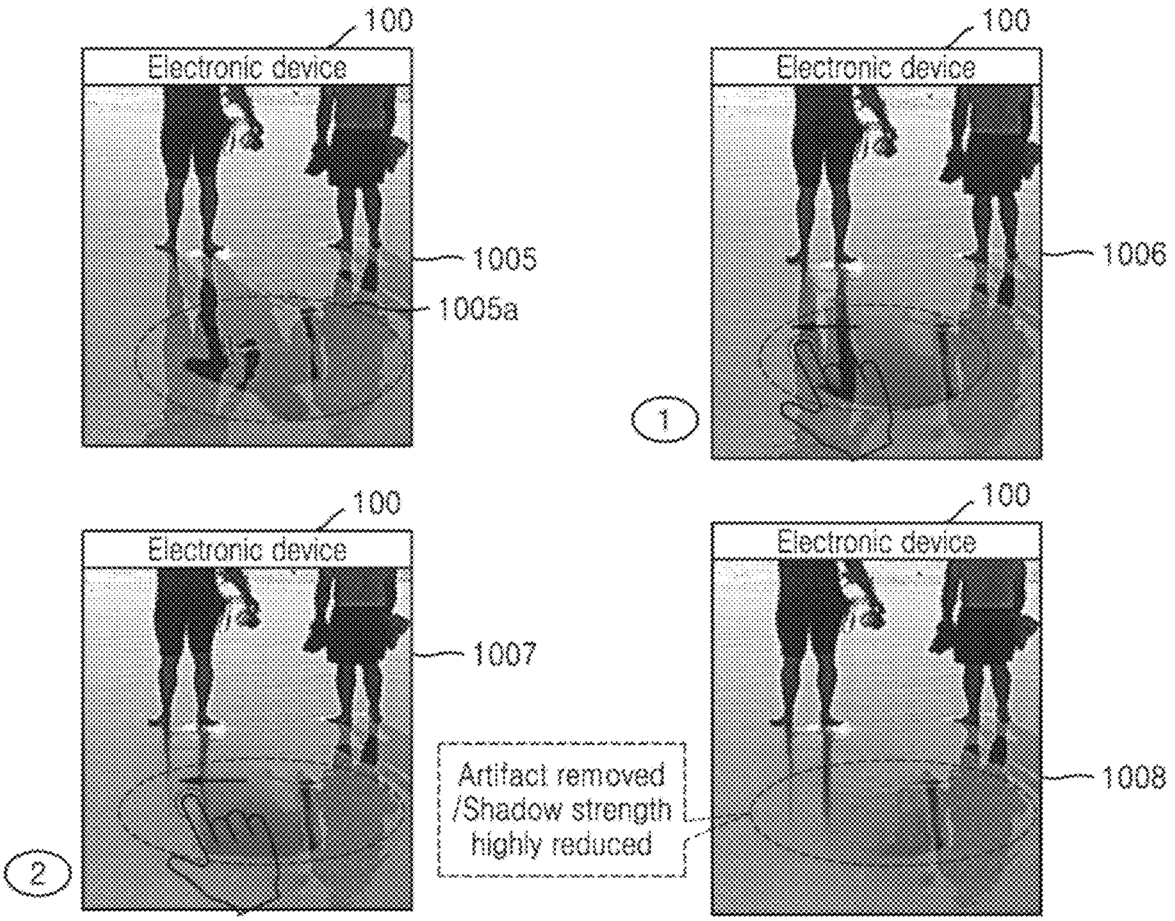

FIG. 10A-10B are scenarios illustrating the method for reducing the strength of the artifact of the image based on the characteristic of the user input, according to another embodiment as disclosed herein.

Referring to FIG. 10A: The electronic device 100 performs various steps (step 1001 to step 1004) to reduce the strength of the artifact of the image based on the characteristic of the user's action.

At step 1001, consider a scenario where the electronic device 100 captures or receives the image and/or displays the image on the screen (i.e., display 140, See FIG. 2) of the electronic device 100, which relates to step 301A of FIG. 3A, where the image includes one or more artifacts (e.g., fog/smoke). At step 1002, which relates to step 302A of FIG. 3A the electronic device 100 detects trigger indication or user input (e.g., light touch gesture ①) to modify the artifact of the image received from the user of the electronic device 100, where the sign "①" indicates that the user of the electronic device 100 uses the light touch gesture on the display 140 to reduce the strength of the artifact. The electronic device 100 determines the artifact modification parameter based on the characteristic of the user input ① and estimates the number of LW networks to be executed or activated based on the artifact modification parameter. The electronic device 100 then modifies, which relates to step 303A of FIG. 3A, the artifact based on the number of executed or activated LW networks. The electronic device 100 then displays the output image at the user interface, where the output image includes the modified artifact.

At step 1003, the electronic device 100 detects another trigger indication/another user input (e.g., strong touch gesture ②) to further modify the modified artifact of the image, where the sign "②" indicates that the user of the electronic device 100 uses the strong touch gesture on the display 140 to further reduce the strength of the modified artifact, which relates to step 303A of FIG. 3A. The electronic device 100 determines another artifact modification parameter based on the characteristic of the user input and estimates another number of LW networks to be executed/activated based on another artifact modification parameter. The electronic device 100 then modifies the artifact based on another number of executed/activated LW networks. At step 1004, the electronic device 100 then displays another output image at the user interface, which relates to step 303A of FIG. 3A, where another output image includes the modified artifact. In other words, the artifact was completely or partially removed based on the user's action.

In another embodiment, the disclosed method includes two features such as find control feature and coarse control feature. Fine control feature means that the light touch gesture is used for finer control of artifacts and only one LW network is used for the light touch gesture. Coarse control feature means that strong touch gesture is used for coarse control of artifacts and multiple LW networks are used for the strong touch gesture.

Referring to FIG. 10B: The electronic device 100 performs various steps (1005 to 1008) to reduce the strength of the artifact of the image based on the characteristic of the user's action.

At step 1005, consider a scenario where the electronic device 100 captures/receives the image and/or displays the image on the screen (i.e., display 140) of the electronic device 100, which relates to step 301A of FIG. 3A, where the image includes one or more artifacts 1005*a* (e.g., shadow). At step 1006, the electronic device 100 detects trigger indication/user input (e.g., the swipe gesture from left to right ①) to modify the artifact of the image received from the user of the electronic device 100, where the sign "①" indicates that the user of the electronic device swipes first time on the display 140 to reduce the strength of the artifact, which relates to step 303A of FIG. 3A. The electronic device 100 determines, which relates to step 302A of FIG. 3A, the artifact modification parameter based on the characteristic of the user input and estimates the number of LW networks to be executed/activated based on the artifact modification parameter. The electronic device 100 then modifies, which relates to step 303A of FIG. 3A, the artifact based on the number of executed/activated LW networks. The electronic device 100 then displays the output image at the user interface, where the output image includes the modified artifact.

At step 1007, the electronic device 100 detects another trigger indication/another user input (e.g., the swipe gesture from left to right ②) to further modify the modified artifact of the image, where the sign "②" indicates that the user of the electronic device 100 swipes second time on the display 140 to further reduce the strength of the modified artifact, which relates to step 303A of FIG. 3A. The electronic device 100 determines another artifact modification parameter based on the characteristic of the user input and estimates another number of LW networks to be executed/activated based on another artifact modification parameter. The electronic device 100 then modifies the artifact based on another number of executed/activated LW networks. At step 1008, the electronic device 100 then displays another output image at the user interface, where another output image includes the modified artifact. In other words, the artifact was completely or partially removed based on the user's action, which relates to step 303A of FIG. 3A.

The various actions, acts, blocks, steps, or the like in the flow diagrams may be performed in the order presented, in a different order, or simultaneously. Further, in some embodiments, some of the actions, acts, blocks, steps, or the like may be omitted, added, modified, skipped, or the like without departing from the scope of the embodiments.

Unlike existing methods and systems, the disclosed method/system enables the electronic device 100 to modify (e.g., increasing/decreasing) the image artifact based on the estimated number of LW networks, where the artifact modification parameter is used to estimate the number of LW networks. The artifact modification parameter is determined based on the characteristic (e.g., direction, speed, time, etc.) of the user input (e.g., swipe, press, etc.). The disclosed method/system provides various technological advancements such as minimizing visible lag to the user by executing one or more lightweight networks to partially reduce artifacts rather than using a larger neural network to completely remove the artifact. As a result, when compared to existing methods and systems, the disclosed method/system produces results faster in real time and consumes less memory (e.g., memory consumption is at least two times lower), thus improving the user experience.

Unlike existing methods and systems, the disclosed method/system enables the electronic device 100 to execute only one LW network for finer control when a fast gesture is applied on the received/captured image and execute multiple sequential LW networks for coarse control when a slow gesture is applied on received/captured image. As a result, when compared to existing methods and systems, the disclosed method/system produces results based on a requirement of the user in real-time and consumes less memory, improving the user experience.

Unless otherwise defined, all technical and scientific terms used herein have the same meaning as commonly understood by one ordinary skilled in the art. The system, methods, and examples provided herein are illustrative only and not intended to be limiting.

While specific language has been used to describe the present subject matter, any limitations arising on account thereto, are not intended. As would be apparent to a person in the art, various working modifications may be made to the method to implement the embodiments. The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. An artificial intelligence based method to correct artifacts in an image or a video, the method comprising:

receiving at least one of user input on at least a portion of the image or a video;

measuring one or more parameters including i) a speed of the at least one user input or ii) the speed of the at least one user input and at least one of a length, a pressure, or a time duration of the at least one user input;

estimating a number of at least one of a plurality of lightweight neural networks or at least one of a plurality of lightweight neural network layers of a lightweight neural network based on the one or more parameters; and activating the number of the at least one of the plurality of lightweight neural networks or the at least one of the plurality of lightweight neural network layers of the lightweight neural network, wherein the plurality of lightweight neural networks and the plurality of lightweight neural network layers are pre-trained to correct the artifacts iteratively, in response to a measurement result of one or more artifact modification parameters, wherein the one or more artifact modification parameters are based on the at least one user input.

2. The method of claim 1, wherein an extent of the activating of artifact correction in the image or the video corresponds to at least one of:

weight of the corresponding activated one or more lightweight neural networks; or at least one of a number of the activated lightweight neural networks or a number of the activated lightweight neural network layers.

3. The method of claim 1, further comprising determining a type among a plurality of types of the at least one user input, wherein the at least one user input corresponds to a different type of artifact comprising a noise effect, a blur effect, or a reflection shadow in the image or the video.

4. A method of modifying an artifact in an image, the method comprising:

detecting, by an electronic device, a user input, wherein the user input indicates a trigger to modify the artifact in the image;

determining, by the electronic device, an artifact modification parameter based on a characteristic of the user input; and modifying, by the electronic device, the artifact in the image based on the artifact modification parameter, wherein the modifying the artifact in the image based on the artifact modification parameter comprises:

estimating, by the electronic device, a number of neural networks or a number of neural network layers of a neural network to be executed based on the artifact modification parameter; and modifying, by the electronic device, the artifact in the image based on an execution of the estimated at least one of the number of neural networks or the number of neural network layers, and wherein the estimating the number of neural networks or the number of neural network layers comprises:

estimating, by the electronic device, a first number of at least one of the neural networks or the neural network layers based on the characteristic having a first speed of the user input.

5. The method of claim 4, wherein the characteristic further comprises at least one of a direction of the user input, a number of instances of a gesture performed, or a time duration of the user input.

6. The method of claim 4, wherein the estimating the number of neural networks or the number of neural network layers further comprises:

estimating, by the electronic device, a second number of at least one of the neural networks or the neural network layers based on the characteristic having a second speed of the user input, wherein the first number is less than the second number, and the first speed is higher than the second speed of the user input.

7. The method of claim 4, wherein the estimating the number of neural networks or the number of neural network layers further comprises:

receiving, by the electronic device, start coordinates of the user input, end coordinates of the user input, and a duration of the user input;

determining, by the electronic device, a direction of the user input from the start coordinates to the end coordinates;

determining, by the electronic device, the artifact modification parameter based on the duration and the direction of the user input; and estimating, by the electronic device, the at least one of the number of neural networks or the number of neural network layers to be executed based on the artifact modification parameter, a maximum swipe duration, and a maximum level of the at least one of the neural networks or the neural network layers available to modify the artifact.

8. The method of claim 4, wherein the modifying the artifact in the image comprises one of reducing or increasing a strength of the artifact in the image based on the characteristic of the user input.

9. The method of claim 8, wherein, when the modifying the artifact comprises reducing the strength of the artifact in the image, the method further comprises:

detecting, by the electronic device, the artifact to be reduced based on a location and a type of the user input;

executing, by the electronic device, the estimated at least one of the number of neural networks or the number of neural network layers to reduce the detected artifact in the image to obtain an output image; and providing, by the electronic device, the output image on a user interface of the electronic device.

10. The method of claim 8, wherein the method further comprises:

saving, by the electronic device, the output image in an output image list;

updating, by the electronic device, a maximum index of images for the output image list to a number of the executed at least one of the number of neural networks or the number of neural network layers;

detecting, by the electronic device, another user input corresponding to the output image;

in response to detecting the another user input corresponding to the output image:

determining, by the electronic device, whether a current number of the executed at least one of neural networks or neural network layers is lower than or equal to a maximum level of at least one of neural networks or neural network layers available for removing the artifact completely;

in response to determining that the current number is lower than or equal to the maximum level, determining, by the electronic device, another artifact modification parameter based on a characteristic of the another user input;

estimating, by the electronic device, another number of the at least one of the neural networks or the neural network layers to be executed based on the another artifact modification parameter;

incrementing, by the electronic device, the current number from the number of the executed at least one of the neural networks or the neural network layers by the estimated number of another number of the at least one of the neural networks or the neural network layers;

determining, by the electronic device, whether the incremented current number is greater than the maximum index of images in an output images list;

detecting, by the electronic device, another artifact to be reduced based on a location and a type of the other user input in response to determining that the current level is greater than the maximum index of images; and executing, by the electronic device, the estimated another number of the neural networks or the neural network layers to reduce the other artifact in the image to obtain another output image; and retrieving and displaying, by the electronic device, at the user interface, the other output image.

11. The method of claim 8, wherein when modifying the artifact comprises increasing the strength of the artifact in the image, the method further comprises:

detecting, by the electronic device, the artifact to be increased based on a location and a type of the user input;

executing, by the electronic device, the estimated at least one of the number of neural networks or the number of neural network layers to increase the detected artifact in the image to obtain an output image; and providing, by the electronic device, the output image on the user interface of the electronic device.

12. The method of claim 8, further comprising:

saving, by the electronic device, the output image in an output image list;

updating, by the electronic device, a minimum index of images for the output image list to a number of the executed at least one of the number of neural networks or the number of neural network layers;

detecting, by the electronic device, another user input corresponding to the output image;

in response to detecting the other user input corresponding to the output image:

determining, by the electronic device, whether a current number of the executed at least one of neural networks or neural network layers is greater than a minimum level of at least one of neural networks or neural network layers available for adding the artifact;

in response to determining that the current number is greater than the minimum level of at least one of neural networks or neural network layers available for adding, by the electronic device, the artifact;

determining, by the electronic device, another artifact modification parameter based on a second characteristic of the another user input;

estimating, by the electronic device, another number of the at least one of the neural networks or the neural network layers to be executed based on the another artifact modification parameter;

decrementing, by the electronic device, the current number from the number of the executed at least one of the neural networks or the neural network layers by the estimated number of another number of the at least one of the neural networks or the neural network layers;

determining, by the electronic device, whether the decremented current number is lower than the minimum index of images in the output image list;

detecting, by the electronic device, another artifact to be increased based on a location and a type of the other user input in response to determining that the current number is lower than the minimum index of images; and executing, by the electronic device, the estimated another number of the neural networks or the neural network layers to increase the other artifact in the image to obtain another output image; and retrieving and displaying, by the electronic device, at the user interface, the other output image.

13. A system for modifying an artifact in an image, the system comprising:

a memory;

a processor;

a communicator;

a display;

a camera; and an image processing engine, operably connected to the memory the processor, the communicator, the display, and the camera, the image processing engine configured to:

detect a user input, wherein the user input indicates a trigger to modify the artifact of the image displayed at a user interface of an electronic device;

determine an artifact modification parameter based on at least one characteristic of the user input; and modify the artifact of the image based on the artifact modification parameter wherein the image processing engine is further configured to modify the artifact by:

estimating at least one of a number of neural networks or a number of neural network layers to be executed based on the artifact modification parameter, wherein each of the neural networks or each of the layers of the neural network is configured to modify at least a part of the artifact; and modifying the artifact in the image based on an execution of the estimated at least one of the number of neural networks or the number of neural network layers.

14. The system of claim 13, wherein the at least one characteristic comprises at least one of a direction of the user input, a speed of the user input, a number of instances of a gesture performed, and a time duration of the user input.

15. The system of claim 13, wherein to estimate the at least one of the number of neural networks or the number of neural network layers, the image processing engine is further configured to:

estimate a first number of at least one of the neural networks or the neural network layers based on a first speed of the user input; and estimate a second number of at least one of the neural networks or the neural network layers based on a second speed of the user input, wherein the first number is less than the second number, and the first speed is higher than the second speed of the user input.

16. The system of claim 13, wherein to estimate at least one of the number of neural networks or the number of neural network layers, the image processing engine is further configured to:

receive start coordinates of the swipe user input, end coordinates of the user input, and a duration of the user input;

determine a direction of the user input from the start coordinates and the end coordinates;

determine the artifact modification parameter based on the duration and the direction of the user input; and estimate the at least one of the number of neural networks or the number of neural network layers based on the artifact modification parameter, an empirically chosen maximum swipe duration, and a maximum level of the at least one of the neural networks or the neural network layers available to modify the artifact.

17. The system of claim 13, wherein to modify the artifact of the image, the image processing engine is further configured to one of reduce or increase a strength of the artifact of the image based on the at least one characteristic of the user input.

18. The system of claim 17, wherein when the image processing engine modifies the artifact by reducing the strength of the artifact in the image, the image processing engine is further configured to:

detect the artifact to be reduced based on a location and a type of the user input;

execute the estimated at least one of the number of neural networks or the number of neural network layers to reduce the detected artifact in the image and obtain an output image; and provide the output image on the user interface of the electronic device.

* * * * *